United States Patent [19]

Michels et al.

[11] Patent Number: 5,763,084
[45] Date of Patent: Jun. 9, 1998

[54] LUBRICANT-CONTAINING PELLETS OF THERMOPLASTICS PROCESSS FOR PREPARING SAME AND USE THEREOF

[75] Inventors: Klaus Josef Maria Michels, Hamm, Germany; Rolando Umali Pagilagan, Parkersburg, Va.

[73] Assignee: E. I. du Pont de Nemours and Company, Wilmington, Del.

[21] Appl. No.: 728,738

[22] Filed: Oct. 11, 1996

Related U.S. Application Data

[63] Continuation of Ser. No. 367,333, Mar. 1, 1995, abandoned.

[51] Int. Cl.$^6$ ................ B32B 5/16; B05D 7/00
[52] U.S. Cl. ........... 428/403; 427/222; 427/242; 427/384; 427/417; 427/419.8; 428/407
[58] Field of Search ................ 428/403, 407; 427/222, 242, 384, 402, 416, 417, 419.5, 419.8; 252/35

[56] References Cited

U.S. PATENT DOCUMENTS

| | | | |
|---|---|---|---|
| 1,749,251 | 3/1930 | Klemgard | 252/35 |
| 4,250,065 | 2/1981 | Phillips, Jr. | 524/399 |
| 4,256,785 | 3/1981 | Dannelly | 427/222 |
| 4,281,036 | 7/1981 | Leithauser et al. | 427/222 |
| 4,420,279 | 12/1983 | Easley, Jr. | 406/14 |
| 4,519,924 | 5/1985 | Kar | 252/35 |
| 4,610,797 | 9/1986 | Kar | 252/35 |
| 4,656,093 | 4/1987 | Lehner et al. | 428/403 |
| 4,661,280 | 4/1987 | Ouhadi et al. | 252/99 |
| 4,704,330 | 11/1987 | Moore et al. | 428/407 |
| 5,006,368 | 4/1991 | Louks | 427/189 |
| 5,032,336 | 7/1991 | Asai et al. | 264/141 |
| 5,236,649 | 8/1993 | Hall et al. | 264/130 |
| 5,273,810 | 12/1993 | Nakano et al. | 428/215 |
| 5,368,972 | 11/1994 | Yamashita et al. | 430/137 |

*Primary Examiner*—H. Thi Le

[57] ABSTRACT

Lubricant-containing pellets of thermoplastic resins which have a continuous lubricant film firmly adhering to the surface of the pellets are created by a process which mixes and combines uncoated pellets of thermoplastic resins with a metal salt of a fatty acid lubricant at a temperature of from 20° C. to 50° C.

5 Claims, No Drawings

LUBRICANT-CONTAINING PELLETS OF THERMOPLASTICS PROCESSS FOR PREPARING SAME AND USE THEREOF

This is a continuation of application Ser. No. 08/367,333 filed Mar. 1, 1995, now abandoned.

BACKGROUND OF THE INVENTION

The present invention relates to lubricant-containing pellets of thermoplastics, and especially those pellets which contain the lubricant in the form of a film firmly adhering to the surface of the pellets.

The invention further relates to processes for the production of these lubricant-containing pellets of thermoplastics and to the use thereof, more particularly for injection molding.

Articles made of thermoplastic materials are conventionally produced from pellets of the thermoplastic resins by injection molding. Auxiliary agents (lubricants) are added to the pellets to achieve trouble-free processing. These agents control the rheology of the melt, and often they involve further positive effects for processing and/or for the optimization of the final product.

Small injection molding machines with short dwell times are especially susceptible to malfunctions occurring in the screw region where the polymer begins to melt. It has been shown that these malfunctions can be eliminated, if suitable lubricants are present in sufficient amounts on the pellets. This cannot be accomplished by a lubricant incorporated in the thermoplastic resin; the lubricant must rather be present on the outer surface of the pellets in order to be effective on the machine walls.

The lubricants generally used for pellets of thermoplastic resins are products of fat chemistry, mostly those of stearin, olein, glycerol; waxes such as montan wax and polyolefin wax; and metal stearates such as aluminum stearate, calcium stearate, zinc stearate and magnesium stearate.

An amount of from 0.01 to 0.5% by weight of said metal stearates in the form of a finely divided powder is usually added to the pellets of thermoplastics and is admixed in continuous mixers or double-cone batch blenders, wherein the metal stearate powder becomes attached to the surface of the pellets. However, the adhesion to the pellets of the metal stearates powder is insufficient so that upon shipment and, more particularly upon the use of pneumatic (pressurized air) conveying systems, a separation of the metal stearate powder occurs. Due to this peel-off, not only the effective lubricant content on the pellet surface is reduced, resulting in a loss in functionality of the pellet-lubricant adduct, but also the released powder causes process-technological drawbacks such as soiling the shipment containers and plugging the filters of conveyor units. In addition, the deposition on the floors of the production plant constitutes a particular source of danger, since areas covered with metal stearates are extremely slippery.

Therefore, the desire has existed for a long time to provide pellets of thermoplastics with a firmly adhering film that has the same lubricant properties as the pellets provided with powdery metal stearates without the disadvantage of the powder coming off.

The manufacture of such film-coated pellets of thermoplastic resins is relatively simple to accomplish for most of the organic materials by way of an application of the film material in the molten state, for example by tumbler coating. Molten solutions of metal stearates can also be applied to pellets to form lubricant coatings (cf. European Patent Specification 0 280 221 B1), however, such coatings are sometimes found to be irregular or uneven, or do not adhere as tightly to the pellets as the lubricant of this invention.

Another approach for firmly linking metal stearate lubricants to the pellets consists of including the lubricants in the pellets. However, thereupon it was found that, mainly in small injection molding machines with short dwell times, the pellets including the lubricant resulted in malfunctions of the feeding process. Thus, a trouble-free functionality of the lubricant-pellet adduct is ensured only if the lubricant will become effective prior to the pellet being melted, thus, if the lubricant is available on the surfaces of the pellets.

SUMMARY OF THE INVENTION

The present invention relates to a process for the preparation of lubricant-containing pellets of thermoplastic resins, comprising (a) uncoated pellets of thermoplastic resins and a lubricant comprised of a metal salt of a fatty acid are combined and mixed at a temperature of from 20° C. to 50° C.; and (b) the resulting pellet-lubricant adducts are then kept in motion so that they are subjected to a sufficient number of mutual impacts and shearing forces causing a firmly adhering, continuous lubricant film to be formed on the pellets.

Processing is more trouble-free when lubricant-containing pellets of thermoplastic resins are used to produce articles.

DETAILED DESCRIPTION

Therefore, it was the object of the present invention to provide pellets of thermoplastic resins, to which pellets the lubricant has been firmly bonded, while the action of the lubricant is not adversely affected thereby.

Surprisingly it was found that it is possible to provide lubricant-containing-pellets of thermoplastic resins wherein the lubricant is present on the surface of the pellets in the form of a firmly adhering lubricant film using a coating process as defined hereinafter. Moreover it was found that a particularly good result is achieved where the lubricant is comprised predominantly (on a weight basis) of an aluminum salt of a fatty acid.

As used herein, the term "firmly adhering, continuous lubricant film" refers to a continuous film which adheres to the surface of the pellets and is essentially free from gaps or holes. The firmly adhering film of this invention is thereby distinguishable from lubricant coatings of the prior art, which tend to resemble powder coatings. This distinction is visible when viewing the coated pellets under a microscope. The firmly adhering film of the present invention will appear somewhat as a varnish on the pellet. It will not easily be visible apart from the fact that light reflects off it somewhat differently as compared to an uncoated pellet. Conversely, the coatings of the prior art will appear under the microscope as discontinuous coatings, i.e., as dusts or very finely divided powders.

The term "is comprised predominantly (on a weight basis) of an aluminum salt of a fatty acid" means that where the lubricant contains more than one component, an aluminum salt of a fatty acid is the component present in the greatest amount on a weight basis.

Preferred according to the present invention are pellets having a lubricant content of from 0.01 to 0.5% by weight, and especially from 0.05 to 0.15% by weight.

The lubricants of the lubricant-containing pellets of thermoplastic resins according to the invention consist preferably of from 75 to 100% by weight of an aluminum salt of a fatty acid and of from 25 to 0% by weight of fat chemistry products, especially fatty acids and fatty alcohols; waxes, especially montan wax and polyolefin wax; and esters and/or metal salts (apart from aluminum) of fatty acids, especially sodium-, magnesium-, calcium- and zinc-stearate, stearyl stearate, and the lithium, odium, and calcium salts of montanic acid. Where the lubricants (other than the metal salts of fatty acids) are in the form of a powder, the powder is preferably milled to a particle size of less than about 1 micron.

According to present invention preferred is a lubricant comprising 75 to 100% by weight, and especially from 90 to 100%, of an aluminum stearate, and especially aluminum distearate.

According to the present invention, the thermoplastic resin may be any melt-processable solid thermoplastic material. The preferred thermoplastic resins include polyesters, polyacetals, polyacrylates, polyamide and/or copolymers or mixtures containing said thermoplastic resins, among which polyamides and copolymers containing polyamides are more preferred. The polyamides of the present invention have been selected from Nylon 6, Nylon 6/6, Nylon 6/9, Nylon 6/10, Nylon 6/12, Nylon 11, Nylon 12 and Nylon 12/12, among which copolymers containing polyamides of adipic acid, hexamethylene diamine and/or caprolactam are preferred.

According to the present invention the lubricant-containing pellets of thermoplastic resins may contain up to 70% by weight of additives and filler materials, including stabilizers, and especially antioxidants and UV absorbents; plasticizers; fillers and minerals, especially talc, chalk, kaolin, wollastonite, slate meal, mica powder and baryte; pigments and dyes; reinforcing agents and impact modifiers, especially glass fibers; flame retardants and nucleating agents, especially salts, talc, High Temperature Nylon, fluorocarbon compounds.

The invention further relates to a process for the preparation of pellets of thermoplastic resins, which process is characterized in that (A) the uncoated pellets of thermoplastic resins and the lubricant are combined and mixed at a temperature below the melting point of the lubricant; and (B) the resulting pellet-lubricant adducts are then kept in motion so that they are subjected to a sufficient number of mutual impacts and shear forces whereby a firmly adhering lubricant film is formed on the pellets.

In a preferred embodiment of the process according to the invention, combining and mixing the pellets with the lubricant is carried out at a temperature of from 20° C. to 50° C., and especially at a temperature of from 40° C. to 50° C. Thereby it is ensured that by means of the process the pellets of thermoplastic resins can be coated without any thermal-oxidative damage (discoloration) in the presence of air.

According to the present invention, in a preferred process embodiment the lubricant is an aluminum salt of a fatty acid, preferably an aluminum stearate, more preferably aluminum distearate, and the pellets are of polyamide, and preferably are Nylon 6/6.

Any device in which the pellets are subjected to the above-described motions is suitable to be used in the process according to the invention. In a preferred embodiment of the process according to the invention the process is operated in a continuous mode (continuous process). It is particularly preferred that the process step (B) takes place in a dense phase conveying system as described in Example 2.

There are many types of pneumatic conveying or transport systems used to move particulate or granular materials such as grain, flour, catalyst, gravel and the like. These systems may range from dilute phase systems which mix fast moving gases and particles, the particles being moved at relatively high velocities through and out of the conveyor or tube, to dense phase systems which push a plug of granular material along the conveyor by applying pressure, sometimes relatively high pressure behind the plug in order to move the plug. The larger the plug of material, the higher the pressure needed, which leads to high velocities at the exit of the conveyor. The typical dense phase system would involve a batch operation in which particles are fed to a hopper, which is connected to the transporter tube, the tube directed into the desired receiving vessel and pressure raised behind the particle in the hopper until the particles have been forced into and out of the tube as a single plug.

A variation on the above-described system is known as a pressure impulse conveying system or a timed pulse conveying system. This type of dense phase system involves the introduction of short slugs or plugs of particles into the conveying or transport line, each plug of particles being at least temporarily separated from another plug of particles by a bubble or plug of gas. The string of plugs of particles and slugs of gas are moved down the conveyor into the receiving vessel as plugs of particles and gas. This timed pulse conveying system reduces the pressure needed in the batch dense phase system described above and enables one to handle more fragile particles and to minimize breakage of those particles being moved.

The present invention further relates to the use of the lubricant-containing pellets of thermoplastic resins for the manufacture of thermoplastic resin-based articles.

The lubricant-containing pellets of thermoplastic resins show the same functional properties as the pellets provided with powdery lubricants; however, they do not tend to have the lubricant coming loose therefrom. Moreover, the process according to the invention allows a lubricant film to be applied onto thermolabile pellets of thermoplastic resins, and especially onto pellets.

In another embodiment of the present invention, it is possible to provide lubricant containing pellets of thermoplastic resins wherein at least two lubricant layers are present. A first lubricant layer is present on the surface of the pellets in the form of a firmly adhering lubricant film using a coating process as defined herein above. At least one additional lubricant layer which is comprised of a lubricant having a melting point of 140° C. or less is present on the surface of the first lubricant layer. Suitable lubricants for the additional lubricant layer(s) are known in the art and include, but are not limited to, montan wax, polyolefin wax, paraffin, N-stearyl eruceamide, and metal stearates. Such additional lubricant layer(s) can be applied by conventional techniques known in the art such as melt spray and tumbling coating techniques.

The present invention is further illustrated by the following Examples:

EXAMPLES

Example 1 (Coating Test)

A reactor comprising a 100 mm in diameter vessel capable of being rotated and performing gyroscopic motions is charged with 100 g of Nylon 6/6 and 0.1 g of powdery lubricant; then, mixing is carried out at room temperature of 60 rpm.

The film forming property of various lubricants at a stirring period of 15 minutes is shown in Table I.

TABLE I

| Example | Lubricant | Remarks |
| --- | --- | --- |
| A | Aluminum Distearate | Film Formation |
| B | Aluminum Tristearate | Firm Formation |
| C | Stearol Stearate | Partial Film Formation |

Example 2 (Continuous Coating)

For continuously coating polyamide pellets with aluminum distearate at a temperature of from 40° C. to 50° C., the pellets of Nylon 6/6 as available after drying and having a regular oval-cylindrical shape are supplied to a continuous mixer, into which at the same time aluminum distearate is introduced in a controlled amount. In the mixer the stearate present as a fine powder is uniformly powdered onto the pellet surfaces.

Through an exit port in the bottom of the mixer the powder-coated pellets are passed through a commercially available dense phase conveying system, (sold, e.g., by the companies WAESCHLE (D-7980 Ravensburg), GERICKE (D-7703 Rielasingen) and BUEHLER (CH-9240 Uzwil). The conveying system will typically be 200 to 350 m in length, preferably about 300 m. At the end of the conveying system the powdered layer, which initially is loosely adhered to the surface, becomes a firmly adhering uniform coating. The product is thereby essentially free from aluminum distearate dust.

Example 3 (Adhesion Test)

An amount of 2.5 g of Nylon 6/6 pellets coated with 0.1% by weight of aluminum distearate (Example 2) and an amount of 2.5 g of conventional Nylon 6/6 pellets containing 0.1% by weight of aluminum distearate (lubricant in powder form) each are washed in 40 ml of Freon® 113 for 10 seconds at a speed of the stirring rod of 88 rpm. After the washing liquid is poured off, the pellets are dried, and the aluminum distearate content is determined.

As a result of the determination, the Nylon 6/6 pellets prepared according to the conventional method (only passed through a continuous mixer) has a residual aluminum distearate content which was by 30% lower.

In the pellets coated by means of the process according to the present invention, 95% to 97% of the aluminum distearate added are present as a firmly adhered film.

Example 4 (Use Test)

Using a small molding machine (NETSTAL AG., Schweiz, Model N 350/150 S with a standard NETSTAL low compression (2.6) screw), the screw retraction time (SRC) is measured at a hold up time of three minutes for each of the Nylon 6/6 pellets treated with 0.1% by weight of aluminum distearate as specified in Table II. The results are also set forth in Table II.

TABLE II

| Example | Sample | SRC (Seconds) |
| --- | --- | --- |
| D | Melt-incorporated | 10.4 to 20.2 |
| E | Powder-coated | 10.1 to 14.5 |
| F | Film-coated/Example 2 | 9.0 to 10.6 |

We claim:

1. A process for the preparation of lubricant-containing pellets of thermoplastic resins, comprising (a) uncoated pellets of thermoplastic resins and a lubricant comprised of a metal salt of a fatty acid are combined and mixed at a temperature of from 20° C. to 50° C.; and (b) the resulting pellet-lubricant adducts are then kept in motion so that they are subjected to a sufficient number of mutual impacts and shearing forces causing a firmly adhering, continuous lubricant film to be formed on the pellets.

2. The process according to claim 1 wherein the process is a continuous process and the process step (b) is carried out in a dense phase conveying system.

3. A process according to claim 1, wherein at least one additional lubricant layer is applied to the surface of the firmly adhering, continuous lubricant film.

4. Lubricant-containing pellets of thermoplastic resins obtainable by a process according to any one of claims 1, 2 or 3.

5. Lubricant-containing pellets of thermoplastic resins prepared in accordance with the process of claim 3, said lubricant-containing pellets having a at least two lubricant layers in which (a) the first lubricant layer is comprised predominately, on a weight basis, of an aluminum salt of a fatty acid and is present on the surface of the pellets in the form of a continuous firmly adhering film; and (b) the second lubricant layer comprising a lubricant having a melting point of 140° C. or less and is present on the surface of the first lubricant layer.

* * * * *